United States Patent

[11] 3,615,777

[72] Inventors Ben Davies;
  George F. Carini, both of Pittsburgh, Pa.
[21] Appl. No. 734,042
[22] Filed June 3, 1968
[45] Patented Oct. 26, 1971
[73] Assignee Dresser Industries, Inc.
  Dallas, Tex.

[54] PHOSPHATE BONDED MAGNESITE-CHROME BRICK
  7 Claims, 2 Drawing Figs.
[52] U.S. Cl. .................................................... 106/59
[51] Int. Cl. ............................................. C04b 35/42
[50] Field of Search ............................................ 106/58, 59

[56] References Cited
UNITED STATES PATENTS
| | | | |
|---|---|---|---|
| 3,522,063 | 7/1970 | Treffner et al. | 106/59 |
| 3,304,187 | 2/1967 | Limes et al. | 106/59 |
| 3,392,037 | 7/1968 | Neely et al. | 106/58 |

*Primary Examiner*—James E. Poer
*Attorneys*—Robert W. Mayer, Raymond T. Majesko and David C. Hanson

ABSTRACT: Magnesite-chrome ore brick having a sodium phosphate binder and extremely high tensile strength as a result of the formation, in service or in burning in a kiln of a calcium sodium silicophosphate bond.

PHOSPHATE BONDED MAGNESITE-CHROME BRICK

BACKGROUND

Magnesite-chrome ore brick are manufactured substantially from dead burned magnesia, which in the refractories art is termed magnesite, and refractory grade chrome ore. In these brick, the magnesite is the major ingredient and the chrome ore the minor ingredient. Chemically bonded brick are those which are not treated by a firing or burning process prior to use. Ceramically bonded brick are burned at temperatures generally in excess of 2500° F.

This patent is closely related to U.S. Pat. No. 3,479,994, issued Nov. 18, 1969 by the same inventors. That application discloses chemically bonded magnesite brick having a calcium sodium silicophosphate bond. This invention is directed to ceramically or chemically bonded magnesite-chrome ore brick. Brick made according to the teachings of this invention may be used, among other places, in the walls of steelmaking open hearth furnaces, in induction furnaces used for melting ferrous and nonferrous metals, and in glass tank regenerator walls and checker settings.

Accordingly, it is an object of this invention to provide magnesite-chrome ore brick with improved tensile strength (as measured by transverse loading or modulus of rupture.) It is another object of this invention to provide a magnesite-chrome ore brick with a sodium phosphate binder that has a modulus of rupture at 2700° F in excess of 500 p.s.i.

BRIEF DESCRIPTION

This invention is predicated upon the discovery that sodium phosphate glasses, when reacted at intermediate temperatures with certain lime and silica-yielding materials, can impart high temperature strength to magnesite chrome ore brick when the $CaO:SiO_2:P_2O_5$ weight ratio of the brick is sufficiently close to 55:12:33. Brick made according to this invention are formed, for example, from a batch consisting essentially of size-graded dead burned magnesite grain and chrome ore and a sodium phosphate glass binder such that the brick typically have a $CaO:SiO_2+CQ2O_5$ weight ratio between 1:1.06 and 1:1.50 and a $CaO:SiO_2$ weight ratio between 2.65:1 and 12.5:1. The $P_2O_5:CaO+SiO_2$ ratio must be greater than 0.28:1. Stated another way, the $CaO:SiO_2:P_2O_5$ ratio typically should fall within area A-B-C-D-E on FIG. 1. Preferably, the $CaO:SiO_2:P_2O_5$ ratio should fall within area F-G-H-I on FIG. 1. The $B_2O_3$ content of brick according to this invention should be less than about 0.08%, by weight. The sodium phosphate binder should yield at least 0.75% $P_2O_5$. The total $CaO+SiO_2+P_2O_5$ in the brick should preferably be less than 10% Preferably, the dead burned magnesite should be at least 90% MgO. It is preferable that the silica content of the brick be less than 1.5 percent, by weight. Optimum results are obtained when the silica content is less than 0.75 percent, by weight. It is preferable that the magnesite to chrome ore weight ratio be between about 90:10 and 60:40 and that the chrome ore be sized to pass 14 mesh and rest on 150 mesh. Burned brick according to the teachings of this invention can be made from unburned shapes formed from batches described above and burned at temperatures in excess of 2800° F.

In order that the brick according to this invention have appropriate $CaO:SiO_2:P_2O_5$ ratios, it is necessary that they be prepared from batches in which the magnesite is prepared having a suitable $CaO:SiO_2$ ratio or in which calcium-yielding materials are added to the batch such as calcium carbonate, calcium ferrite, calcium aluminate, calcium chromite, or mixtures thereof. According to another aspect of this invention, burned magnesite-chrome ore brick are prepared having an appropriate $CaO:SiO_2$ ratio and are thereafter impregnated with sufficient soluble phosphate to provide the brick with a $CaO:SiO_2:P_2O_5$ weight ratio, according to the teachings of this invention.

Burned brick according to the teachings of this invention display an unusual microstructure. It is characterized by periclase grains bonded partially by calcium sodium silicophosphate phase and partially by a complex spinel phase

DETAILED DESCRIPTION

Further features and other objects and advantages of this invention will become clear to those skilled in the art by a careful study of the following detailed description. In the detailed description, all sizings are reported by Tyler screen series; all percentages and parts are by weight; chemical analyses were obtained by spectrographic analysis with control by wet chemical analysis, and are reported as oxides in accordance with the present practice of the refractories industry.

Figure 1:
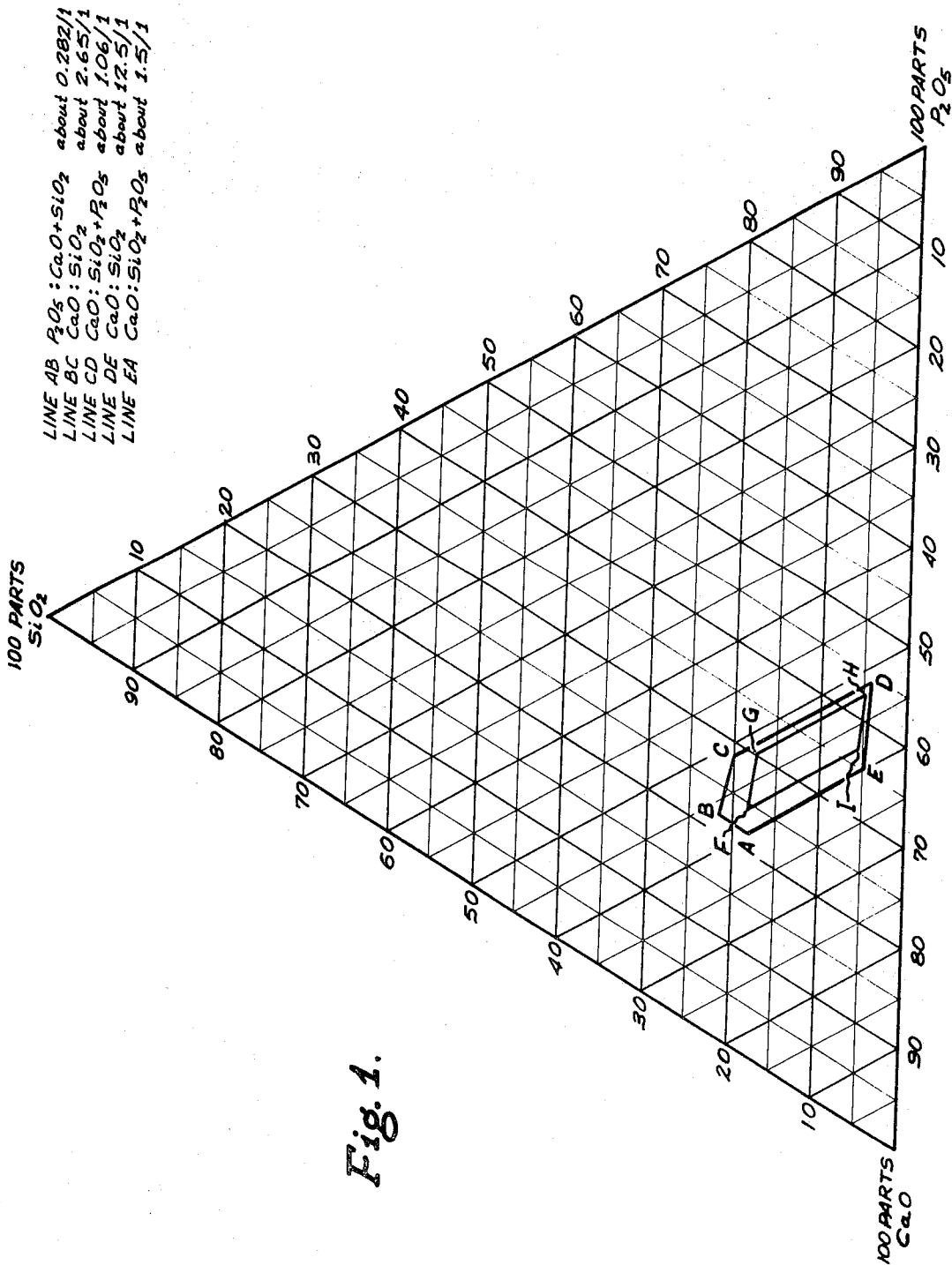
FIG. 1 is a ternary diagram which shows the $CaO:SiO_2:P_2O_5$ ratios suitable in brick according to the teachings of this invention.

The detailed discussion is made with reference to FIG. 1 which is a ternary diagram on which the relative proportions of $CaO:SiO_2:P_2O_5$ of the brick according to the teachings of this invention are outlined. Proportions are calculated from the chemical analysis without reference to MgO, or other oxides, the major components of the refractory which, of course, have no influence on the proportion of the CaO, $SiO_2$, and $P_2O_5$.

This invention is based on the discovery that certain calcium sodium silicophosphates provide a refractory bond for

TABLE I

| Example | A | B | C | D | E | F | G | H | I |
|---|---|---|---|---|---|---|---|---|---|
| Batch (parts by weight): | | | | | | | | | |
| Dead burned magnesite A | 60 | 70 | 80 | 90 | 80 | 70 | 80 | 80 | 80 |
| Transvaal chrome ore | 40 | 30 | 20 | 10 | | 30 | 20 | 20 | 20 |
| Philippine chrome ore | | | | | 20 | | | | |
| Calcium carbonate | 2.85 | 2.13 | 3.54 | 1.07 | 4.90 | | | | |
| Sodium metaphosphate | 2.0 | 2.0 | 4.0 | 2.0 | 4.0 | 2.0 | 2.6 | 2.0 | 2.0 |
| Portland cement Type III | | | | | | 1.6 | | | |
| Calcium ferrite | | | | | | | | 2.25 | 2.25 |
| Calcium aluminate cement | | | | | | | 4.6 | | |
| Burn, ° F | | | | | | | | | 3,150 |
| Bulk density, p.c.f | 200 | 199 | 194 | 187 | 190 | 192 | 188 | 194 | 194 |
| Apparent porosity, percent after heating to 2,000° F) | 17.2 | 16.7 | 16.4 | 16.9 | 17.8 | 17.8 | 16.0 | 15.4 | 15.4 |
| Modulus of rupture, p.s.i.: | | | | | | | | | |
| At room temperature | 1,230 | 1,400 | 2,610 | 1,570 | 2,570 | 1,350 | 1,470 | 1,430 | 1,770 |
| At 2,700° F | 1,010 | 1,180 | 1,660 | 1,260 | 1,300 | 670 | 1,450 | 1,190 | 1,510 |
| Relative proportion of CaO, $SiO_2$ and $P_2O_5$: | | | | | | | | | |
| CaO | 59.4 | 56.3 | 53.0 | 56.5 | 55.9 | 59.3 | 54.1 | 54.6 | 51.6 |
| $SiO_2$ | 13.5 | 15.1 | 10.9 | 14.5 | 10.9 | 17.6 | 13.2 | 16.1 | 14.9 |
| $P_2O_5$ | 27.1 | 28.6 | 36.1 | 29.0 | 33.2 | 23.1 | 32.7 | 29.3 | 33.4 |
| Chemical analysis (percentage): | | | | | | | | | |
| Silica ($SiO_2$) | 0.64 | 0.68 | 0.75 | 0.65 | 0.81 | 0.95 | 0.65 | 0.71 | 0.55 |
| Alumina ($Al_2O_3$) | 6.2 | 4.7 | 3.3 | 1.8 | 6.7 | 8.5 | 6.4 | 3.4 | 3.4 |
| Iron oxide ($Fe_2O_3$) | 11.1 | 8.2 | 5.8 | 3.1 | 3.1 | 8.5 | 5.4 | 7.1 | 7.2 |
| Chromic oxide ($Cr_2O_3$) | 17.6 | 13.0 | 9.3 | 4.8 | 6.5 | 13.1 | 8.5 | 9.1 | 7.9 |
| Lime (CaO) | 2.81 | 2.54 | 3.66 | 2.54 | 4.15 | 3.20 | 2.70 | 2.40 | 1.90 |
| Magnesia (MgO) | By difference | | | | | | | | |
| Phosphorous oxide ($P_2O_5$) | 1.28 | 1.29 | 2.49 | 1.30 | 2.46 | 1.25 | 1.63 | 1.29 | 1.39 |
| Boron oxide ($B_2O_3$)* | 0.030 | 0.030 | 0.030 | 0.030 | 0.030 | 0.030 | 0.060 | 0.030 | 0.030 |
| Soda ($Na_2O$) | 0.60 | 0.60 | 1.16 | 0.60 | 1.14 | 0.58 | 0.75 | 0.60 | 0.64 |

*Less than amount reported.

magnesite-chrome ore brick. Briefly, we have found that those brick either burned or unburned which have a $CaO:SiO_2:P_2O_5$ weight ratio sufficiently near 55:12:33 have unexpectedly high tensile strength. (The oxide ratios referred to in this specification are by weight.) This discovery is indeed surprising as in the past it has generally been considered that lime should be maintained as low as possible in magnesite-chrome ore brick.

Examples A through I, the batches in parts by weight and properties of which are shown in table I, are according to the teachings of this invention. They were prepared from size-graded batches of dead burned magnesite, chrome ore, and lime-yielding materials and a sodium metaphosphate glass binder. The chemical analyses of the chrome ores and magnesites are given in table VIII. The batches were tempered with water and pressed into brick at about 1200° p.si. The brick were dried to about 250° F. for about 10 hours and thereafter tested for bulk density, apparent porosity, modulus of rupture at room temperature and at 2700° F. The chemical analyses were also determined. Example I was given the additional treatment step of being burned at 3150° F. prior to testing.

Table I establishes that a brick made according to the teachings of this invention has strength, as measured by modulus of rupture at2700, in excess of 500 p.s.i. and often in excess of 1000 p.s.i. Table I also establishes that various magnesite:chrome ore ratios can be used in the practice of this invention. Also, the table establishes that different types of chrome ore can be used, such as Transvaal chrome ore or Phillippine chrome ore. It should be mentioned, however, that chrome ore satisfactory for use in this invention must have a low sicica content preferably below 1.5 percent but satisfactorily below 3 percent. Table I further establishes that various lime-yielding materials can be used in order to supply sufficient lime to the brick such that the brick will have a satisfactory $CaO:SiO_2:P_2O_5$ ratio.

Figure 2:
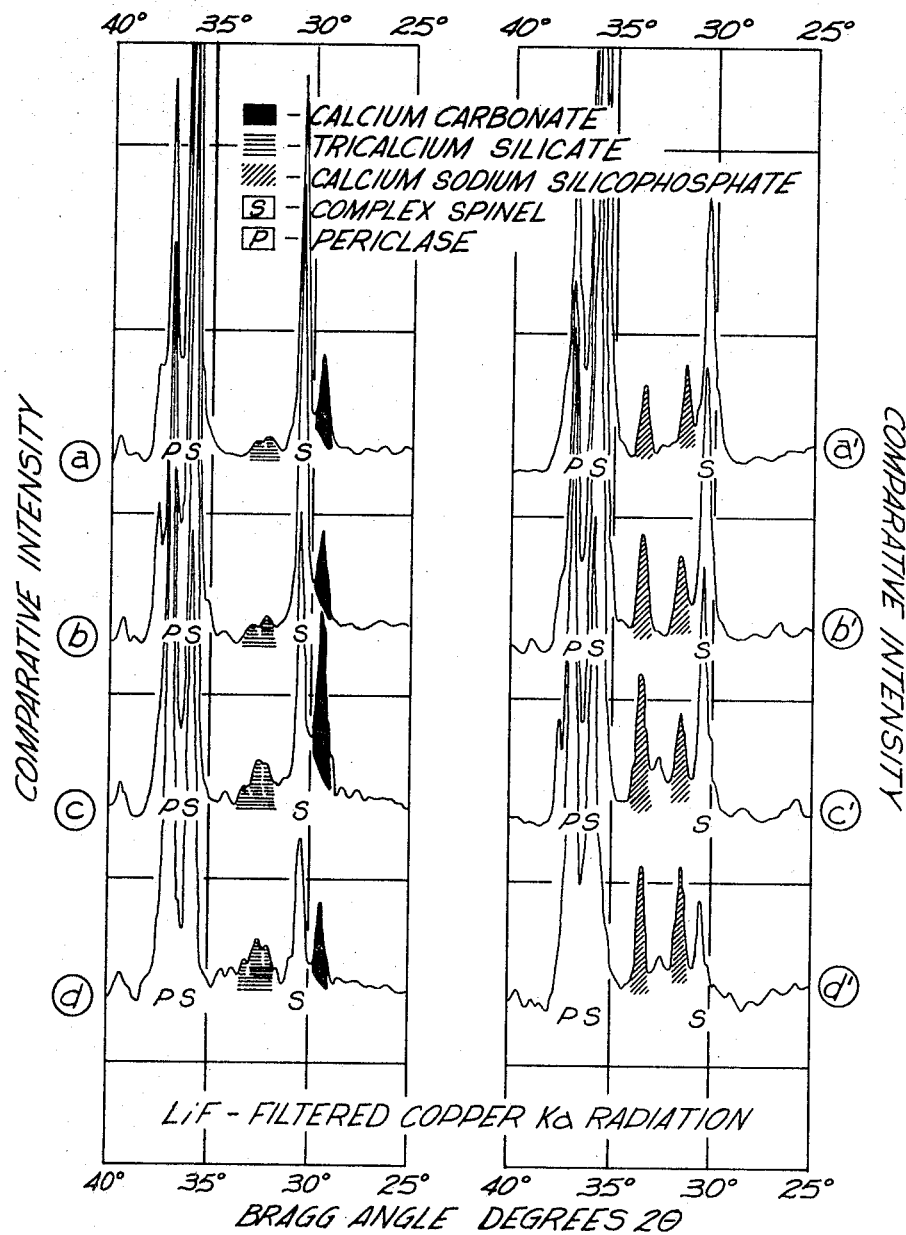
FIG. 2 contains X-ray diffraction patterns of examples hereinafter discussed.

To obtain a better understanding of our invention, X-ray diffraction studies of Examples A, B, C, and D were made immediately after the sample brick were dried at 500° F. and after they had been tested for modulus of rupture at 2700° F. The diffraction patterns are given in FIG. 2. Immediately after drying, the brick contained calcite and sodium phosphate (amorphous to X-rays) and phases typically associated with dead burned magnesite (FIG. 2 a, b, c, d). After heating to 2700° F, however the phase assemblage is entirely different. A calcium sodium silicophosphate phase had been formed FIG. 2 a', b', b, c',d'). Standard X-ray powder diffraction procedures were followed.

To obtain a still better understanding of our invention, the distribution of selected elements was determined from X-ray ($K\alpha$) images of various areas of polished surfaces of examples H and I using an electron probe X-ray microanalyzer. These examples were prepared in the same manner except that example H was heated to 2700° F. in the modulus of rupture test and example I was fired at 3150° F.

The electron microprobe X-ray images established that example H, which is an unburned brick but tested after heating to 2700° F, comprises magnesite and chrome ore grains bonded together by a calcium sodium siliconphosphate phase. The X-ray images showed that example I, which is a brick burned at 3150° F., comprises periclase grains containing complex spinel inclusions bonded by a complex spinel phase and a calcium sodium silicophosphate phase.

The calcium sodium silicophosphate solid solution is developed in a solid state reaction between sodium phosphate and various lime and silica-yielding materials at relatively low temperatures (below 2300° F.) aided, apparently, by the reaction-accelerating effect of the sodium cation. The refractoriness of the system is not affected detrimentally by the limited presence of sodium. Sodium enters the calcium silicophosphate structure filling vacant calcium positions in the lattice which are unoccupied because of the difference in valence between $SiO_4$ and $PO_4$ groups. In our experience the soda can be present in an amount less than about 0.5 times the $P_2O_5$ weight percent. Substances, particularly solid solutions, with unoccupied cation positions are not unusual. In effect, the sodium ions are isolated and not available for reaction with other components to form low melting compounds. The structure of the calcium sodium silicophosphate solid solution is analogous to the high temperature form of the calcium silicophosphate solid solution series suggesting that sodium effectively stabilizes the calcium silicophosphate structure in its high temperature form. Strength variations at elevated temperatures, attributable to structural inversions, are consequently eliminated.

The examples whose properties are recorded in table I were prepared according to one technique in which lime-yielding materials were added to the batch with the magnesite and chrome ore. Another technique is to combine chrome ore with a magnesite having an appropriate lime:silica ratio. It is very difficult to incorporate magnesites having lime:silica rations in excess of about 3:1 in brickmaking batches because of the tendency to have free lime in the magnesite that will hydrate. Therefore, it is usually necessary that magnesites having high lime: silica ratios also contain an appropriate amount of iron oxide, chromic oxide, or alumina to react with and tie up any free lime that might be present in the magnesite. Examples J and K were prepared from a magnesite having a lime to silica ratio of about 4:1 and sufficient iron oxide to make the magnesite usable in brickmaking batches. The chemical analysis of this magnesite is given in table VIII. The batch comprised 80 parts magnesite and 20 parts Transvaal chrome ore and 2.2 parts sodium metaphosphate glass binder. The chrome ore was sized to all pass 14 mesh and rest on 65 mesh. The magnesite was sized so that approximately 30 parts was −4+10 mesh, 15 parts −10+28 mesh, and 35 parts was ball mill fines which were substantially all −65 mesh. The batches were tempered with water and pressed into shapes at about 12000 p.s.i. They were thereafter dried. Example K was thereafter burned at 3150° F. The batches and the properties of exemplary mixes J and K are given in table II.

It should be noted that the chemical analyses of examples J and K differ. This is due to a minor loss of lime and silica during the burning at 3150° F. Other examples throughout this specification may have chemical analyses that differ from what might be expected considering the chemical analyses of the starting materials. This is simply because the chemical analyses of the starting materials vary somewhat. For this reason, they are described in table VIII as typical.

TABLE II

| Example | J | K |
| --- | --- | --- |
| Batch (parts by weight): | | |
| Dead burned magnesite B | 80 | 80 |
| Transvaal chrome ore | 20 | 20 |
| Sodium metaphosphate | 2.2 | 2.2 |
| Burn, ° F. | | 3,150 |
| Bulk density, p.c.f. | 199 | 195 |
| Apparent porosity, percent (after heating to 2,000° F.) | 12.1 | 14.9 |
| Modulus of rupture, p.s.i.: | | |
| At room temperature | 1,310 | 1,530 |
| At 2,700° F | 1,380 | 1,930 |
| Relative proportion of CaO, $SiO_2$, and $P_2O_5$: | | |
| CaO | 56.6 | 51.2 |
| $SiO_2$ | 15.2 | 14.6 |
| $P_2O_5$ | 28.3 | 34.1 |
| Chemical analysis (percentage): | | |
| Silica ($SiO_2$) | 0.75 | 0.60 |
| Alumina ($Al_2O_3$) | 3.50 | 3.50 |
| Iron oxide ($Fe_2O_3$) | 7.5 | 7.5 |
| Chromic oxide ($Cr_2O_3$) | 8.1 | 8.0 |
| Lime (CaO) | 2.80 | 2.10 |
| Magnesia (MgO) | By difference | |
| Phosphorous oxide ($P_2O_5$) | 1.43 | 1.50 |
| Boron oxide ($B_2O_3$)* | 0.030 | 0.030 |
| Soda ($Na_2O$) | 0.66 | 0.70 |

*Less than amount reported.

Table II establishes that brick having outstanding high temperature strength can be made by the method of blending chrome ore, sodium phosphate and a magnesite with an appropriate $CaO:SiO_2$ ratio.

Another method of making magnesite-chrome ore brick according to this invention consists of preparing a burned magnesite-chrome ore brick having an appropriate $CaO:SiO_2$ ratio and thereafter impregnating the brick with sufficient phosphate binder to adjust the $CaO:SiO_2:P_2O_5$ ratio.

Examples L to P were prepared to show the effect of varying the $CaO:SiO_2+P_2O_5$ ratio in magnesite-chrome ore brick. The batches for these examples are given in table III.

amples were added increasing amounts of boric acid. The batches from which these examples were prepared and their properties are given in table V.

TABLE III

| Example | L | M | N | O | P |
|---|---|---|---|---|---|
| Batch (parts by weight): | | | | | |
| Dead burned magnesite A | 80 | 80 | 80 | 80 | 80 |
| Transvaal chrome ore | 20 | 20 | 20 | 20 | 20 |
| Calcium carbonate | | | | | 2.0 |
| Calcium ferrite | 3.0 | | 4.94 | | |
| Calcium aluminate cement | | 4.3 | | 4.6 | |
| Sodium metaphosphate | 1.7 | 2.28 | 3.0 | 2.6 | 3.0 |
| Bulk density, p.c.f | 195 | 189 | 196 | 188 | 193 |
| Apparent porosity, percent (after heating to 2,000° F.) | 15.7 | 17.1 | 15.1 | 16.0 | 17.0 |
| Modulus of rupture, p.s.i.: | | | | | |
| At room temperature | 950 | 1,480 | 1,790 | 1,470 | 1,970 |
| At 2,700° F | 280 | 1,060 | 1,260 | 1,450 | 390 |
| Relative proportion of CaO, $SiO_2$, and $P_2O_5$: | | | | | |
| CaO | 60.6 | 57.1 | 55.8 | 54.1 | 52.0 |
| $SiO_2$ | 13.7 | 13.1 | 12.9 | 13.2 | 13.3 |
| $P_2O_5$ | 25.6 | 29.8 | 31.3 | 23.7 | 34.7 |
| $CaO:SiO_2+P_2O_5$ | 1.55:1 | 1.33:1 | 1.28:1 | 1.18:1 | 1.08:1 |
| Chemical analysis (percentage): | | | | | |
| Silica ($SiO_2$) | 0.60 | 0.62 | 0.75 | 0.66 | 0.75 |
| Alumina ($Al_2O_3$) | 3.5 | 6.1 | 34. | 6.4 | 3.1 |
| Iron oxide ($Fe_2O_3$) | 7.9 | 6.0 | 8.2 | 5.4 | 5.4 |
| Chromic oxide | 9.5 | 9.4 | 9.2 | 8.5 | 8.5 |
| Lime (CaO) | 2.65 | 2.70 | 3.24 | 2.70 | 2.92 |
| Magnesia (MgO) | | | By difference | | |
| Phosphorous oxide ($P_2O_5$) | 1.12 | 1.41 | 1.82 | 1.63 | 1.94 |
| Boron oxide ($B_2O_3$)* | 0.030 | 0.030 | 0.030 | 0.060 | 0.030 |
| Soda ($Na_2O$) | 0.51 | 0.64 | 0.84 | 0.75 | 0.90 |

*Less than amount reported.

Table III establishes that the proper $CaO:SiO_2+P_2O_5$ ratio is an essential feature of this invention. Example L contained too much CaO in relation to $SiO_2$ and $P_2O_5$ present. Example P, on the other hand, has too little lime. Examples M, N, and O have excellent transverse strengths in excess of 1,000 p.s.i. at 2,700° F.

Examples Q through V were prepared in the same manner as examples A through H. These examples all had about the same $CaO:SiO_2+P_2O_5$ ratio but differed in their $CaO:SiO_2$ ratios. The batches from which examples Q through V were prepared and the properties of these examples are given in table IV.

Table V establishes that the boron oxide content of brick made according to the teachings of this invention should be less than about 0.08.

Examples BB, CC, and DD were prepared from batches in which the sizing of the chrome ore was varied. Increasing amounts of chrome ore ball mill fines which were substantially all −150 mesh were substituted for 14 on 150 mesh chrome ore. The batches from which these examples were prepared and the properties are given in table VI.

Table VI establishes that best results were obtained when the chrome ore is all passed 14 held on 150 mesh. However, even

TABLE IV

| Example | Q | R | S | T | U | V |
|---|---|---|---|---|---|---|
| Batch (parts by weight): | | | | | | |
| Dead burned magnesite A | 80 | 80 | 80 | 80 | 80 | 80 |
| Transvaal chrome ore | 20 | 20 | 20 | 20 | 20 | 20 |
| Calcium carbonate | | | | | | 4.4 |
| Calcium ferrite | | 2.03 | 2.25 | | 3.2 | |
| Calcium aluminate cement | | | | 3.35 | | |
| Sodium metaphosphate | 1.14 | 2.0 | 2.0 | 2.2 | 3.0 | 4.0 |
| Bulk density, p.c.f | 194 | 193 | 194 | 188 | 196 | 194 |
| Apparent porosity, percent (after heating to 2,000° F.) | 15.8 | 16.7 | 15.4 | 15.9 | 15.1 | 17.0 |
| Modulus of rupture, p.s.i.: | | | | | | |
| At room temperature | 900 | 1,220 | 1,430 | 1,430 | 1,790 | 2,660 |
| At 2,700° F | 440 | 1,060 | 1,190 | 1,090 | 1,260 | 1,550 |
| Relative proportion of CaO, $SiO_2$, and $P_2O_5$: | | | | | | |
| CaO | 55.6 | 54.6 | 54.5 | 54.8 | 55.2 | 55.0 |
| $SiO_2$ | 20.6 | 17.4 | 16.1 | 14.5 | 12.8 | 10.1 |
| $P_2O_5$ | 23.9 | 28.0 | 29.3 | 30.7 | 32.0 | 34.9 |
| $CaO:SiO_2+P_2O_5$ | 1.25:1 | 1.20:1 | 1.20:1 | 1.21:1 | 1.23:1 | 1.22:1 |
| $CaO:SiO_2$ | 2.7:1 | 3.1:1 | 3.4:1 | 3.8:1 | 4.3:1 | 5.5:1 |
| Chemical analysis (percentage): | | | | | | |
| Silica ($SiO_2$) | 0.63 | 0.79 | 0.71 | 0.66 | 0.75 | 0.72 |
| Alumina ($Al_2O_3$) | 3.6 | 3.4 | 3.4 | 5.7 | 3.4 | 3.1 |
| Iron oxide ($Fe_2O_3$) | 6.9 | 6.6 | 7.1 | 5.8 | 8.2 | 5.5 |
| Chromic oxide ($Cr_2O_3$) | 10.0 | 8.8 | 9.1 | 9.2 | 9.2 | 8.7 |
| Lime (CaO) | 1.70 | 2.48 | 2.40 | 2.50 | 3.24 | 3.92 |
| Magnesia (MgO) | | | By difference | | | |
| Phosphorous oxide ($P_2O_5$) | 0.73 | 1.27 | 1.29 | 1.40 | 1.88 | 2.49 |
| Boron oxide ($B_2O_3$)* | 0.030 | 0.00 | 0.00 | 0.00 | 0.030 | 0.030 |
| Soda ($Na_2O$) | 0.33 | 0.59 | 0.60 | 0.65 | 0.86 | 1.16 |

* Less than amount reported.

Table IV establishes the importance of the lime:silica ratio for brick according to the teachings of this invention. We have found that the $CaO:SiO_2$ should be greater than 2.65:1. this invention. Example Q is just within the teachings of this $CaO:SiO_2$ ratios as large as 12.5:1 are satisfactory according to invention. Note, however, the large difference in hot strengths of examples Q and R.

Examples W through Z and AA were prepared in the same manner as examples A through H. To the batches of these exwith the inclusion of ball mill fine chrome ore in the batch, outstanding high temperature strengths are achieved.

By way of comparison, a typical chemically bonded magnesite-chrome ore brick having a lignosulfonate binder was prepared and tested for modulus of rupture at 2700° F. Example EE was prepared in the same way as example C, except that the former has a conventional lignosulfonate binder and the latter a sodium phosphate binder. Example C is over 30 times stronger at 2700° F. than example EE. The test batch and data for example EE are given in table VII.

TABLE V

| Example | W | X | Y | Z | AA |
|---|---|---|---|---|---|
| Batch (parts by weight): | | | | | |
| Dead burned magnesite A | 80 | 80 | 80 | 80 | 80 |
| Transvaal chrome ore | 20 | 20 | 20 | 20 | 20 |
| Calcium ferrite | 2.62 | 2.62 | 2.62 | 2.62 | 2.62 |
| Sodium metaphosphate | 2.0 | 2.0 | 2.0 | 2.0 | 2.0 |
| Boric acid | 0 | 0.08 | 0.16 | 0.24 | 0.32 |
| Bulk density, p.c.f. | 192 | 192 | 192 | 192 | 192 |
| Apparent porosity, percent (after heating to 2,000° F.) | 16.7 | 17.2 | 17.4 | 17.2 | 17.0 |
| Modulus of rupture, p.s.i.: | | | | | |
| At room temperature | | | | | |
| At 2,700° F | 1,120 | 1,060 | 450 | 380 | 280 |
| Relative proportion of CaO, $SiO_2$, and $P_2O_5$: | | | | | |
| CaO | 56.0 | 55.8 | 56.4 | 55.7 | 56.0 |
| $SiO_2$ | 15.5 | 16.3 | 16.0 | 16.2 | 15.7 |
| $P_2O_5$ | 28.5 | 27.9 | 27.7 | 28.1 | 28.2 |
| Chemical analysis (percentage): | | | | | |
| Silica ($SiO_2$) | 0.72 | 0.76 | 0.75 | 0.76 | 0.73 |
| Alumina ($Al_2O_3$) | 3.4 | 3.5 | 3.5 | 3.4 | 3.3 |
| Iron oxide ($Fe_2O_3$) | 7.1 | 7.7 | 7.3 | 7.4 | 7.2 |
| Chromic oxide ($Cr_2O_3$) | 9.1 | 9.8 | 9.6 | 9.4 | 9.1 |
| Lime (CaO) | 2.61 | 2.60 | 2.65 | 2.62 | 2.60 |
| Magnesia (MgO) | By difference | | | | |
| Phosphorous oxide ($P_2O_5$) | 1.33 | 1.30 | 1.30 | 1.32 | 1.31 |
| Boron oxide ($B_2O_3$) | 0.020 | 0.065 | 0.110 | 0.155 | 0.200 |
| Soda ($Na_2O$) | 0.61 | 0.60 | 0.60 | 0.61 | 0.60 |

TABLE VI

| Example | BB | CC | DD |
|---|---|---|---|
| Batch (parts by weight): | | | |
| Dead burned magnesite A | 80 | 80 | 80 |
| Transvaal chrome ore: | | | |
| Pass 14 held on 150 | 20 | 16 | 12 |
| Ball milled fines | 0 | 4 | 8 |
| Calcium carbonate | 1.45 | 1.45 | 1.45 |
| Sodium metaphosphate | 2.0 | 2.0 | 2.0 |
| Bulk density, p.c.f. | 192 | 192 | 191 |
| Modulus of rupture, p.s.i.: | | | |
| At room temperature | 1,350 | 1,360 | 1,240 |
| At 2,700° F | 1,500 | 1,100 | 960 |
| Relative proportion of CaO, $SiO_2$, and $P_2O_5$: | | | |
| CaO | 56.0 | 56.3 | 55.9 |
| $SiO_2$ | 16.1 | 15.8 | 16.1 |
| $P_2O_5$ | 27.9 | 27.9 | 28.0 |
| Chemical analysis (percentage): | | | |
| Silica ($SiO_2$) | 0.75 | 0.75 | 0.75 |
| Alumina ($Al_2O_3$) | 3.3 | 3.4 | 3. |
| Iron oxide ($Fe_2O_3$) | 5.8 | 5.9 | 5.7 |
| Chromic oxide ($Cr_2O_3$) | 9.3 | 9.2 | 9.2 |
| Lime (CaO) | 2.61 | 2.60 | 2.60 |
| Magnesia (MgO) | By difference | | |
| Phosphorous oxide ($P_2O_5$) | 1.30 | 1.29 | 1.30 |
| Boron oxide ($B_2O_3$)* | 0.03 | 0.03 | 0.03 |
| Soda ($Na_2O$) | 0.60 | 0.59 | 0.60 |

*Less than amount reported.

Further by way of comparison, two exemplary phosphate bonded magnesite-chrome ore brick were prepared by simply adding a sodium phosphate glass binder to typical dead burned magnesite and typical chrome ore without attempting to control the $CaO:SiO_2:P_2O_5$ ratio, for example, by adding lime-yielding materials. These brick had adequate intermediate temperature strengths (modulus of rupture at 2300° F.) but were weak at 2700° F. which is much nearer the operating temperature of most furnaces in which magnesite-chrome ore brick are used. The data for examples FF and GG are given in table VII. This invention is an improvement over brick of this type as it provides brick with excellent strength at 2700° F.

TABLE VII

| Example | EE | FF | GG |
|---|---|---|---|
| Batch (parts by weight): | | | |
| Dead burned magnesite A | 80 | 80 | 80 |
| Transvaal chrome ore | 20 | 20 | 20 |
| Sodium metaphosphate | 0 | 0.57 | 1.7 |
| Lignosulfonate liquor | 5 | | |
| Bulk density, p.c.f. | 198 | 192 | 194 |
| Apparent porosity, percent | 15.3 | 16.3 | 14.6 |
| Modulus of rupture, p.s.i.: | | | |
| At room temperature | 1690 | 490 | |
| At 2,300° F | | 720 | 1150 |
| At 2,700° F | 50 | 370 | 190 |
| Relative proportion of CaO, $SiO_2$, and $P_2O_5$: | | | |
| CaO | 74.4 | 63.0 | 48.1 |
| $SiO_2$ | 25.6 | 23.3 | 18.0 |
| $P_2O_5$ | | 13.7 | 33.9 |
| Chemical analysis (percentage): | | | |
| Silica ($SiO_2$) | 0.60 | 0.63 | 0.60 |
| Alumina ($Al_2O_3$) | 3.3 | 3.8 | 3.4 |
| Iron oxide ($Fe_2O_3$) | 6.1 | 6.8 | 6.1 |
| Chromic oxide ($Cr_2O_3$) | 9.2 | 10.6 | 9.3 |
| Lime (CaO) | 1.8 | 1.70 | 1.60 |
| Magnesia (CaO) | By difference | | |
| Phosphorous oxide ($P_2O_5$) | 0 | 0.37 | 1.13 |
| Boron oixde ($B_2O_3$)* | 0.03 | 0.03 | 0.03 |
| Soda ($Na_2O$) | 0 | 0.16 | 0.52 |

*Less than amount reported.

RAW MATERIALS AND TEST PROCEDURES

By sodium phosphate binders we mean sodium phosphates which are molecularly dehydrated and polymerized. The have a soda to phosphorous ratio generally ranging from 1.1:1 to 1.8:1. These glasses are highly soluble, but retain their molecular structure well in solutions. Commercial metaphosphate glasses ($Na_2O:P_2O_5$ ratio is 1:1) includes "-Glass H" and "Glass A" proprietary products of FMC Corporation, and "Calgon" a proprietary product of the Calgon Corporation. "Quadrophos" is a proprietary product of the Ramford Chemical Corporation and is a suitable sodium phosphate glass which has an $Na_2O:P_2O_5$ ratio of 1.5:1. The typical chemical analyses of the magnesite and chrome ores used in exemplary mixes is given in the following table.

TABLE VIII

| | Magnesite A | B | Transvaal Chrome Ore | Philippine Chrome Ore |
|---|---|---|---|---|
| Silica ($SiO_2$) | 0.7 | 0.84 | 1.01 | 2.8 |
| Alumina ($Al_2O_3$) | 0.4 | 0.31 | 15.0 | 29.5 |
| Iron Oxide ($Fe_2O_3$) | 0.2 | 2.5 | 26.9 | 13.9 |
| Chromic Oxide ($Cr_2O_3$) | | | 47.5 | 34.6 |
| Lime (CaO) | 2.4 | 3.85 | 0.21 | 0.4 |
| Magnesia (MgO) | by difference | | 10.5 | 17.2 |
| Boron Oxide ($B_2O_3$) | 0.03 | 0.02 | 0.03 | not tested |

A typical size grading for the exemplary batches would be as follows:

| | |
|---|---|
| Pass 4 held on 10 mesh | 30% |
| Pass 10 held on 28 mesh | 30 |
| Pass 28 held on 65 mesh | 10 |
| Pass 65 mesh | 30 |

Bulk densities of the samples were determined by ASTM method c134-41, Manual of ASTM Standards on Refractory Materials, 9th edition, 1963, pages 154 et seq. Modulus of rupture at room temperature was determined by ASTM method C133-55, pages 145 et seq. of the same manual; modulus of rupture at 2700° F. was determined similarly to the modulus of rupture at room temperature, except the test was performed in an electrically heated furnace.

Having thus described the invention in detail, and with sufficient particularity as to enable those skilled in the art to practice it, what is desired to have protected by Letters Patent is set forth in the following claims.

We claim:
1. A method of making magnesite-chrome ore brick comprising the steps of:
   1. preparing a batch consisting essentially of dead burned magnesite and chrome ore in a weight ratio between

90:10 and 60:40, said batch analyzing less than 0.08 percent $B_2O_3$,
2. tempering the batch with a suitable tempering fluid and binder,
3. forming the tempered batch into shapes,
4. burning the shapes at temperatures in excess of 2800° F., and
5. impregnating the burned shapes with sufficient sodium phosphate solution to provide a $CaO:SiO_2:P_2O_5$ weight ratio in the shapes within the area A-B-C-D-E in FIG. 1.

2. A method according to claim 1 in which the weight ratio of CaO to $SiO_2+P_2O_5$ is between 1:1.06 to 1.50:1 and the weight ratio of CaO to $SiO_2$ is between 2.65 and 12.5:1 and the $P_2O_5$:$CaO+SiO_2$ ratio is greater than 0.28:1.

3. A method according to claim 1 in which the $CaO:SiO_2:P_2O_5$ ratio falls within the area F-G-J-I on FIG. 1.

4. A method to claim 1 in which the dead burned magnesite is at least 90 percent MgO.

5. A method to claim 1 in which the $SiO_2$ is less than 1.5 percent, by weight.

6. A method according to claim 1 in which the $SiO_2$ is less than 0.75 percent, by weight.

7. A method according to claim 1 in which the chrome ore is sized to pass 14 mesh and rest on 150 mesh.

PO-1050
(5/69)

UNITED STATES PATENT OFFICE
CERTIFICATE OF CORRECTION

Patent No. 3,615,777  Dated October 26, 1971

Inventor(s) Ben Davies and George F. Carini

It is certified that error appears in the above-identified patent and that said Letters Patent are hereby corrected as shown below:

Claim 3, line 2, change "J" to --H--.

Claim 4, line 1, before "to" insert --according--.

Claim 5, line 1, before "to" insert -- according--.

Signed and sealed this 12th day of March 1974.

SEAL)
ttest:

DWARD M. FLETCHER, JR.
ttesting Officer

C. MARSHALL DANN
Commissioner of Patents